United States Patent [19]

Gresh

[11] 4,336,620
[45] Jun. 29, 1982

[54] SELF-SKIMMING DISH RINSER

[76] Inventor: Peter P. Gresh, 389 Linwood Dr., Miami Springs, Fla. 33166

[21] Appl. No.: 166,565

[22] Filed: Jul. 7, 1980

[51] Int. Cl.³ .......................... A47K 1/12; A47K 4/00
[52] U.S. Cl. .................................... 4/639; 4/641; 4/619; 4/650; 4/651; 4/286; 4/287
[58] Field of Search ........................ 4/286–295, 4/538, 539, 541–544, 553–554, 559, 583–584, 591, 619, 622, 638, 650–653, 654, 656, 659, 641, 661

[56] References Cited

U.S. PATENT DOCUMENTS

| | | | |
|---|---|---|---|
| 137,788 | 4/1873 | Moore | 4/287 |
| 475,941 | 5/1892 | Hawkins | 4/641 |
| 587,559 | 8/1897 | Riley | 4/290 X |
| 1,664,521 | 4/1928 | Mayette | 4/656 X |
| 1,842,289 | 1/1932 | Russel | 4/641 |
| 2,065,009 | 12/1936 | Mallet | 4/641 |
| 2,205,018 | 6/1940 | Osuch | 4/641 |
| 2,594,938 | 4/1952 | Leavitt | 4/639 |
| 2,679,652 | 6/1954 | Eyring | 4/541 |
| 3,248,741 | 5/1966 | Stout et al. | 4/539 X |
| 3,294,004 | 12/1966 | Benson | 4/640 X |
| 3,346,884 | 10/1967 | Roy | 4/592 |
| 3,377,634 | 4/1968 | Patterson | 4/290 |
| 4,162,545 | 7/1979 | Hallen | 4/650 |

FOREIGN PATENT DOCUMENTS 203532  7/1955  Australia ................................ 4/641

Primary Examiner—Henry K. Artis
Attorney, Agent, or Firm—John Cyril Malloy

[57] ABSTRACT

A self-skimming dish rinser for adaptation in a standard conventional sink comprising a liner inserted in the sink having side walls approximately equal to but slightly less than the sink side walls and a tray bottom having a drain opening fitting and aligned with the sink drain opening. The rinser including centering structure extending from the drain opening for facilitating such alignment. Additionally, the rinser side walls and bottom are sized and shaped to fit inside the conventional sink and the rinser side walls are spaced a predetermined distance from the sink side walls and remain in that position via the centering structure extending from the drain opening.

1 Claim, 3 Drawing Figures

SELF-SKIMMING DISH RINSER

BACKGROUND OF THE INVENTION

Technical Field

This invention relates to rinsers and more particularly to self-skimming rinsers.

In the past there have been many rinser designs that have recognized various principles of cleaning. Applicant's invention recognizes the principle that grease rises to the top and that the surface water must be constantly clean for the rinse water to stay clean.

SUMMARY OF THE INVENTION

Applicant's invention comprises a tray-like structure having a bottom with a drain opening and generally upstanding side walls having a predetermined height and that predetermined height being less than the height of a conventional sink. Additionally, the tray fits completely within the sink and the side walls of the tray are spaced a predetermined distance from the sink side walls to allow the rinse water to flow past the side walls and down the sink drain opening leaving generally clean water in the rinser.

In accordance with these and other objects which will become apparent hereinafter, the instant invention will now be described with reference to the accompanying drawings in which:

DESCRIPTION OF THE PREFERRED EMBODIMENT

Figure 1:
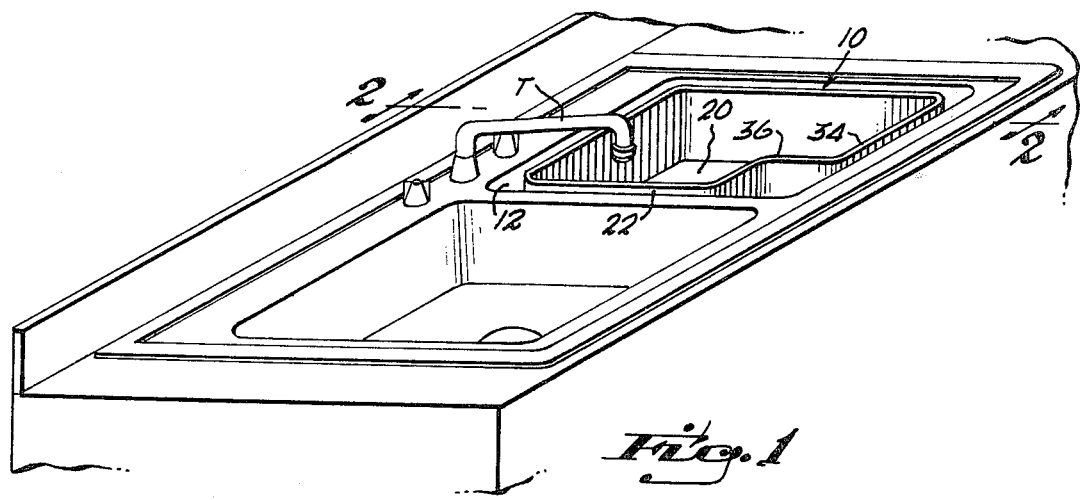
FIG. 1 is a perspective view of the self-skimming dish rinser shown in place in a standard double basin sink.

Referring to the drawings wherein like reference characters designate like or corresponding parts throughout the several views and particularly referring to FIG. 1, there is shown the invention a self-skimming dish rinser generally denoted by the numeral 10 shown in place in a sink 12 wherein the sink includes a bottom such as at 14 and upstanding side walls 16 and a drain opening 18.

Figure 2:
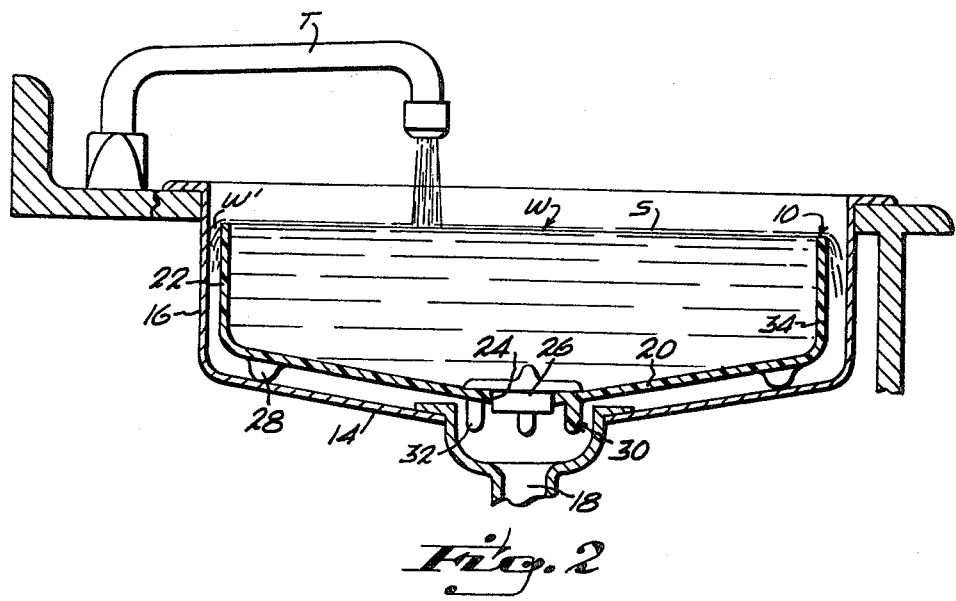
FIG. 2 is a sectional view of the rinser shown in FIG. 1 taken along line 2—2.

As can be seen more clearly in FIG. 2, the rinser 10 includes a bottom 20 and upstanding side walls such as at 22. The bottom 20 has a drain hole 24 which can be positioned above sink drain hole 18 for allowing the rinse water to drain as will be more fully appreciated hereinafter.

The rinser includes a drain plug 26 and feet means such as at 28 spacing the rinser bottom 20 a predetermined distance above the sink bottom 14.

In the embodiment shown in FIG. 2, the bottom side walls are angled toward the drain opening to facilitate drainage and as will be appreciated the bottom need not be structured this way although it is believed by applicant to be a preferred embodiment of this invention.

The upstanding side walls of the rinser embodiment shown in FIG. 2 and denoted by the numeral 22 are spaced a predetermined distance from the sink side wall 16 to facilitate waterflow past the rinser side wall 22 and to allow drainage along the sink side wall 16 to sink drain opening 18. As is indicated in FIG. 2, water W flows over the side walls as at W'.

Figure 3:
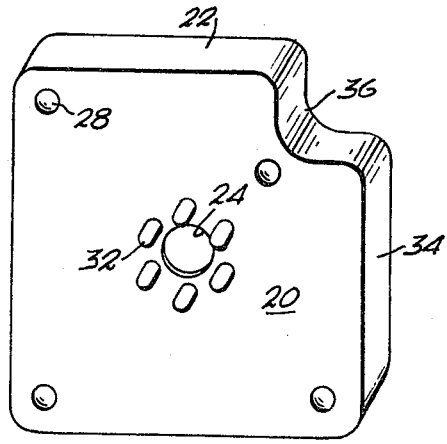
FIG. 3 is a bottom perspective elevational plan view of the rinser shown in FIG. 1.

In the preferred embodiment the rinser 10 includes a centering means 30 comprising a downwardly depending skirt and in the embodiment shown more clearly in FIG. 3 comprises finger-like projections 32 extending downwardly from the rinser drain opening 24.

Additionally, the side walls may include a front side wall such as at 34 and in FIG. 1 wherein the front side wall 34 includes a first portion 36 which comprises an L-shaped side wall and is clearly shown in FIG. 3. It has been found that this L-shape facilitates the user's ability to clear the drain and remove the rinser when desired.

In Use

As shown in FIG. 2 the drain plug 26 is applied over the rinser drain opening 24. Water W then fills the rinser as shown in FIG. 2 through a water valve such as a standard sink tap generaly denoted by T in FIG. 2.

A dish may then be placed for rinsing in the rinser and as will be appreciated by those skilled in the art, grease tends to rise to the top of the water surface such as at S in FIG. 2. When enough water is applied to the rinser the overflow will carry the surface water S to a position such as W' wherein the greasy water will flow through the sink drain opening 18.

The centering prongs provide a means for keeping the rinser side walls and the sink side walls a predetermined distance from the side walls so that thus, the self-skimming rinser will always have a means of allowing the surface water which is greasy to flow over the side walls keeping the rinse water generally clean.

When the rinsing operation has been completed, the plug 26 is removed from the rinser bottom and water then flows past drain opening 18. When the rinser is emptied of its water, the user simply inserts his hand through L-shaped side wall 36 for removal of the rinser 10. Then the rinser 10 may be easily cleaned and stored conveniently.

The L-shaped wall 36 also facilitates the disposal of water from dishes, pots, pans, etc. when the dish rinser is normally in place in a sink or sink portion equipped with an electrically operated disposal unit.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. In combination, a sink having a well bounded by upstanding side walls spaced from one another a predetermined distance and being of a predetermined height and including a bottom with a central recessed drain opening; and a sink-skimming rinser sized for and received within the well, said rinser comprising a tray having a bottom and upstanding side walls of a predetermined height approximately equal to but less than the predetermined height of the sink side walls, said bottom having a drain opening to register with the sink drain opening, centering means extending downwardly from the tray bottom and received in the recessed drain opening for aligning the rinser and sink drain openings, a drain plug sized to cover and close the tray drain opening and feet means on the tray bottom spaced from the tray a predetermined distance from the sink bottom for supporting the tray bottom above the sink bottom, said centering means comprising downwardly extending finger-like projections and said tray being sized with respect to the centering means such that the walls of the tray are spaced inwardly from the walls of the sink to allow overflow water to drain past the rinser side walls and down between the sink side walls and the rinser side walls to the sink drain opening to flow between the finger-like projections;

said sink bottom and tray bottom being angled inwardly and downwardly toward their repective drain openings; and said side walls of said tray being recessed inwardly from the side walls of the sink at a zone to facilitate lifting of the device out of engagement with the sink and pouring of matter from dishes directly into the sink such as coffee remaining in a cup.

* * * * *